(12) United States Patent
Risch

(10) Patent No.: US 8,562,031 B2
(45) Date of Patent: Oct. 22, 2013

(54) LOCKING MEANS FOR AN AIRCRAFT DOOR

(75) Inventor: Ronald Risch, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 206 days.

(21) Appl. No.: 12/775,568

(22) Filed: May 7, 2010

(65) Prior Publication Data

US 2010/0308603 A1 Dec. 9, 2010

Related U.S. Application Data

(60) Provisional application No. 61/176,124, filed on May 7, 2009.

(30) Foreign Application Priority Data

May 7, 2009 (DE) .......................... 10 2009 020 274

(51) Int. Cl.
E05C 19/10 (2006.01)
B64C 1/14 (2006.01)

(52) U.S. Cl.
USPC ......................................... 292/95; 244/129.5

(58) Field of Classification Search
CPC ... E05B 65/006; E05B 67/383; G06F 1/1679; E04F 15/02
USPC ............ 292/95, 114, 120, 99, 101, 103, 145, 292/146, 147, 300, 302, 1, 150, DIG. 53, 292/DIG. 54, DIG. 64; 244/117 R, 119, 120, 244/123.8, 129.4, 129.5; 49/397, 398, 399, 49/400
See application file for complete search history.

(56) References Cited

U.S. PATENT DOCUMENTS

| | | | | |
|---|---|---|---|---|
| 3,585,757 A | * | 6/1971 | Ritchie et al. | 49/215 |
| 3,653,615 A | * | 4/1972 | Spence | 244/137.1 |
| 4,167,258 A | * | 9/1979 | Robertson | 244/129.5 |
| 4,637,642 A | * | 1/1987 | Stoecker | 292/129 |
| 5,636,814 A | * | 6/1997 | Rollert | 244/129.5 |
| 5,720,449 A | * | 2/1998 | Laboure et al. | 244/110 B |
| 5,868,355 A | * | 2/1999 | Carter, Jr. | 244/129.5 |
| 6,109,563 A | * | 8/2000 | Verhoeven et al. | 244/129.5 |
| 6,454,210 B1 | * | 9/2002 | Plattner | 244/129.5 |
| 6,568,637 B2 | * | 5/2003 | Bluem et al. | 244/129.5 |
| 7,275,717 B2 | * | 10/2007 | Landry | 244/129.5 |
| 2010/0308603 A1 | * | 12/2010 | Risch | 292/95 |

FOREIGN PATENT DOCUMENTS

DE 19825405 A1 6/1999

* cited by examiner

*Primary Examiner* — Kristina R Fulton
*Assistant Examiner* — Nathan Cumar
(74) *Attorney, Agent, or Firm* — Leydig, Voit & Mayer, Ltd.

(57) ABSTRACT

A locking device for an aircraft door in a fuselage section of an aircraft includes at least one fuselage fitting disposed in a region of a sill of the fuselage section and at least one door fitting disposed in a region of a lower edge of the aircraft door and corresponding in number to the at least one fuselage fitting. The at least one fuselage fitting and the at least one door fitting are each configured to transfer at least one of a circumferential load and a radial load.

16 Claims, 3 Drawing Sheets

LOCKING MEANS FOR AN AIRCRAFT DOOR

CROSS REFERENCE TO PRIOR APPLICATIONS

Priority is claimed to German Patent Application No. DE 10 2009 020 274.9, filed May 7, 2009 and to U.S. Provisional Application No. 61/176,124, filed May 7, 2009. The entire disclosure of said applications is incorporated by reference herein

FIELD

The present invention concerns a locking means for an aircraft door, in particular for a cargo door of an aircraft.

BACKGROUND

Aircraft doors of this type in a fuselage section of an aircraft accommodate significant loads around their circumference. The larger the diameter of a fuselage section, the higher are the circumferential loads ensuing in the structure of the fuselage section. Depending upon the type of aircraft the circumferential forces can achieve levels of more than 150,000 N. Radial loads are also introduced into the aircraft door; these result from the pressure difference between an ambient air pressure and a fuselage section internal pressure, amongst other sources. While the radial loads are smaller than the circumferential loads, they nevertheless represent a loading onto the aircraft door, that is to say, onto its locking means.

The transfer of loads between the aircraft door and the fuselage section structure takes place by means of solutions of known art, with a multiplicity of hooks arranged such that they can pivot on a shaft; in the region of the fuselage section these hooks grip around essentially horizontally attached shaft sections. By virtue of the high forces to be transferred the hooks and shaft sections are massively designed and as a result are heavy. A solution of this type is described, for example, in DE 198 25 405 C2. In order to prevent any automatic pivoting of the hooks out of the secured position, the locking means, in addition to an opening and closing device, has a complex locking device and a locking means monitoring device.

What is disadvantageous about this locking means is its complexity and the large number of components. Furthermore it is heavy and, by virtue of the multiplicity of components, expensive. Moreover the transfer of forces by means of the hooks and shaft sections is not optimal, since the structure in the region of the hooks is very highly loaded, and moments also arise.

SUMMARY

An aspect of the present invention is to create a locking means for aircraft doors, such as for cargo doors, which avoids the above-cited disadvantages and enables an improved introduction of force into the aircraft door.

In an embodiment, the present invention provides a locking device for an aircraft door in a fuselage section of an aircraft which includes at least one fuselage fitting disposed in a region of a sill of the fuselage section and at least one door fitting disposed in a region of a lower edge of the aircraft door and corresponding in number to the at least one fuselage fitting. The at least one fuselage fitting and the at least one door fitting are each configured to transfer one of a circumferential load and a radial load.

BRIEF DESCRIPTION OF THE DRAWINGS

The present invention is described in greater detail below on the basis of embodiments and of the drawings in which.

DETAILED DESCRIPTION

Figure 1:
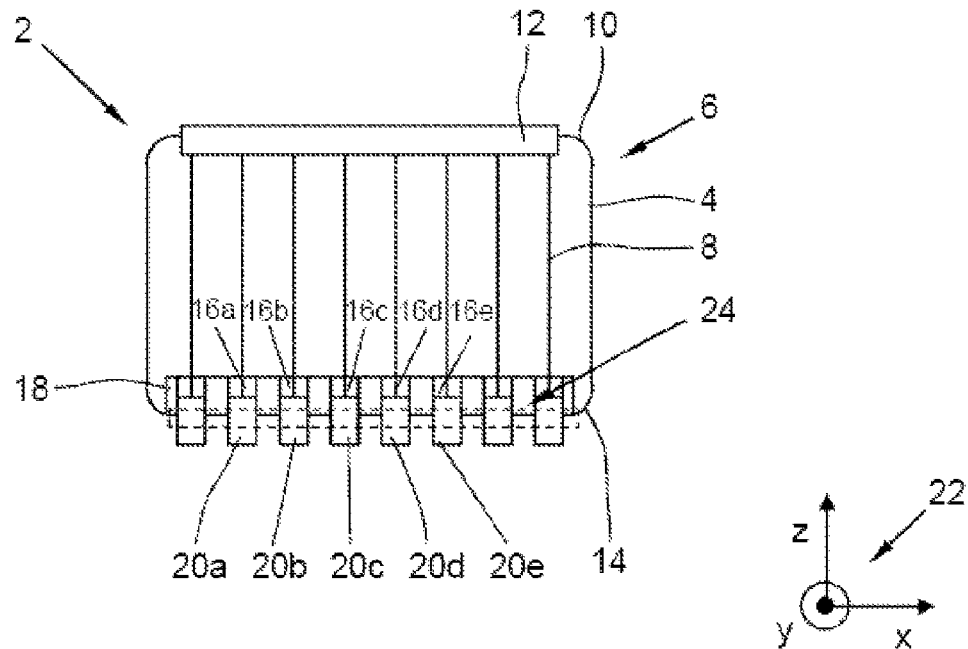
FIG. 1 shows a schematic view of an aircraft door in a fuselage section.

In an embodiment of the present invention, the circumferential loads and the radial loads transferred or introduced into the aircraft door are transferred or introduced into the aircraft door at a distance relative to one another in the longitudinal direction of the aircraft. A multiplicity of load introduction points is thus created and a less concentrated introduction of load is achieved than is the case with the prior art. By virtue of the significantly higher circumferential loads the fittings that accommodate the radial loads can be executed in a weight-optimised manner.

In an embodiment of the present invention, the transfer of the circumferential loads takes place via at least one of the fuselage fittings, which is located in a form fit engagement with at least one of the door fittings. The form fit allows a simple and reliable connection between the two fittings. The fuselage fitting and the door fitting are, for example, designed in the form of hooks.

The transfer of the radial loads can take place via at least one sliding element, which is located in engagement with at least one of the door fittings and with at least one of the fuselage fittings. For this purpose the respective fuselage fitting and the respective door fitting can in each case have a projection, with which the sliding element can be brought into engagement.

The sliding element can, for example, be moved in the longitudinal direction of the aircraft for unlocking purposes and is guided in at least one of the door fittings. The movement of the sliding element for unlocking purposes in a direction approximately at right-angles to the loading direction has the advantage that no inadvertent opening of the aircraft door is possible. It is advantageous that only a few components engage with one another, so that the solution according to the present invention is less vulnerable to malfunctions, and the tolerances to be maintained between the components can be virtually ruled out as critical factors. Alternatively the sliding element can also be guided along the fuselage.

Transfer of the radial loads can, for example, take place between two door fittings for guidance of the sliding element. By this means the guides are evenly loaded and any jamming or deformation of the sliding element is prevented.

Since the circumferential loads that occur are significantly higher than the radial loads that occur, it is advantageous if the fuselage fittings for the transfer of the circumferential loads are executed to be larger than the fuselage fittings for the transfer of the radial loads.

In an embodiment of the present invention, the door fittings for the transfer of the circumferential loads, the door fittings for the transfer of the radial loads, and the door fittings for the guidance of the sliding element in the longitudinal direction of the aircraft, can be arranged side by side in a consistently repeating sequence. By this means a simple structure of the locking means is possible, as is an even, repeating transfer or introduction of loading.

In an embodiment of the present invention, the fuselage fittings can be designed as a collective fuselage fitting with a multiplicity of load transfer surfaces for the transfer of the circumferential loads; these surfaces can be arranged one behind another in the longitudinal direction of the aircraft. The fuselage fittings form quasi-individual sections of the fitting, with in each case a load transfer surface of a primary fuselage fitting.

The door fittings can also be integrated into a common door fitting with a multiplicity of load introduction surfaces for the introduction of the circumferential loads; these surfaces can be arranged one behind another in the longitudinal direction of the aircraft.

The term "one behind another" is not limited to "side by side" or "adjacent," but rather comprises all conceivable series formations of the load transfer or load introduction surfaces. Thus, for example, the load transfer surfaces in each case can be spaced apart by a radial load transfer means, or can be arranged in groups side by side, which are spaced apart by individual radial load transfer means, or by groups for purposes of radial load transfer. The radial load transfer means can also flank or surround a group of load transfer surfaces, and thus form end sections of the locking means in the quasi-longitudinal direction of the aircraft. Correspondingly, the load transfer surfaces can flank the radial load transfer means. Furthermore it should be noted that more, as many, or fewer circumferential load transfer points can be provided as radial load transfer points.

The introduction of the circumferential loads and radial loads can take place essentially free of moments, as a result of which a further weight optimisation of the locking means and the adjacent structure can be made possible. In particular no disruptive moment arises in the circumferential direction as a result, FIG. 1 shows an aircraft door 2, or a cargo door, in an aperture 4 in a fuselage section 6 of an aircraft, not illustrated. Between the aperture 4 and the aircraft door 2 elements, not illustrated, are provided for purposes of pressure-tight sealing.

The aircraft door 2 has a multiplicity of vertically running formers, of which one former 8 that is representative of the others is provided with a reference symbol. The fuselage door 2 is hinged on the fuselage section 6 with a hinge 12 such that it can pivot about an upper edge 10.

On a lower edge 14 of the aircraft door 2 are located a multiplicity of evenly spaced apart door fittings (former spacing), of which just some door fittings 16a, 16b are provided with a reference symbol, being representative of all the others.

In the region of a sill 18 of the fuselage section are arranged a number of fuselage fittings corresponding with the number of door fittings 16a, 16b, of which, in the interests of better clarity of the drawing, just some fuselage fittings 20a, 20b, . . . are likewise provided with a reference symbol.

A coordinate system 22 illustrates the location of the components in space. The aircraft has a longitudinal axis, which runs essentially in the direction of the x-axis of the coordinate system 10. The aircraft door 2 has a pivot axis, which runs parallel to the x-axis and enables an opening of the aircraft door 2 outwards in the direction of the y-axis. The z-axis of the coordinate system 22 represents the yaw axis of the aircraft 2.

By means of the door fittings 16a, 16b, . . . and the fuselage fittings 20a, 20b, . . . major loads running circumferentially in the fuselage section 6 (essentially parallel to the z-axis) and also further loads directed radially outwards (essentially parallel to the y-axis) are led via the aircraft door 2. This means that the aircraft door 2 is subjected to the full structural loads in the same manner as the rest of the fuselage section 6 external to the aircraft door 2. The circumferential loads, depending on the type of aircraft, can account for more than 90% of the total mechanical loading on the door fittings 16a, 16b, . . . and the fuselage fittings 20a, 20b. The remaining 10% of the total loading results from radial loads, amongst other sources, which as a result of the difference in air pressure between the internal pressure of the fuselage section 6 and the local ambient air pressure are attempting to push the aircraft door 2 outwards.

According to the present invention the circumferential loads and the radial loads are introduced into the aircraft door 2, displaced relative to one another in the longitudinal direction of the aircraft, as a result of which a multiplicity of load introduction points are created. This takes place such that the fuselage fittings 20a, 20b, . . . and the door fittings 16a, 16b, . . . transfer either the circumferential loads or the radial loads. As used herein, transfer of the circumferential or radial loads means essentially transfer. "Essentially" takes account of the fact that the opening direction of the aircraft door 2 does not run at right-angles to the external skin of the fuselage section 6, but rather at an angle of approximately 70°. The arrangement of the fuselage fittings 20a, 20b, . . . and the door fittings 16a, 16b, . . . takes place in a repeating sequence, so that the circumferential loads and the radial loads in the region of the sill 18 or lower edge 14 are transferred, or introduced, in a symmetrically distributed manner.

In an embodiment of the present invention, the transfer of the circumferential loads can take place via the fuselage fittings 20a, 20e and the door fittings 16a, 16e. At the point half-way between these fittings 20a, 20e and 16a, 16e in the longitudinal direction of the aircraft the transfer of the radial loads takes place via the fuselage fitting 20c and the door fitting 16c. Between the fittings 20a, 16a, and 20e, 16e, for the transfer of the circumferential loads and the fittings 20c, 16c for the transfer of the radial loads a door fitting 16b, 16d is arranged in each case for the guidance of a sliding element 24 indicated by dashed lines and explained in the following figures.

Figure 2:
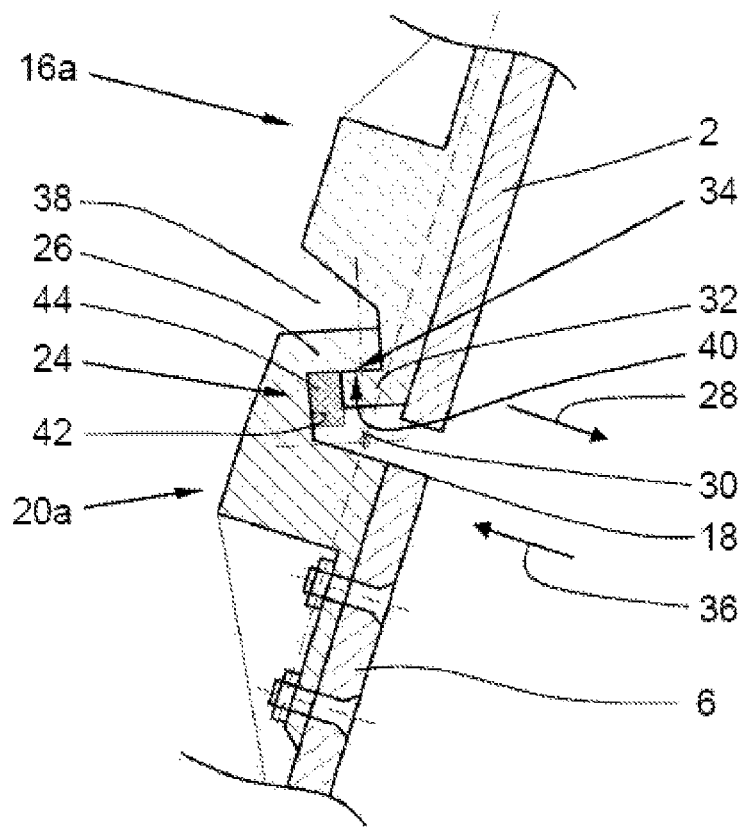
FIG. 2 shows a cross-section through a fuselage fitting and a door fitting for the transfer of circumferential loads.

FIG. 2 shows in a manner representative of all fuselage and door fittings for the transfer or introduction of the circumferential loads a cross-section through the fuselage fitting 20a and the door fitting 16a for the transfer of the circumferential loads in the closed state.

The body of the fuselage fitting 20a has a hook-shaped region 26, which projects beyond the sill 18 of the fuselage section 6 and bounds a recess 30 open in the opening direction 28 of the aircraft door 2 for the accommodation of a hook-shaped region 32 of the body of the door fitting 16a in the circumferential direction. The region 26 of the body of the fuselage fitting 20a has a flat load transfer surface 34 for the transfer of the circumferential loads into the aircraft door 2; this surface runs essentially in the pivoting direction of the aircraft door 2.

The door fitting 16a is provided with a backwards step 38 oriented in the closing direction 36, which is bounded in the circumferential direction via its hook-shaped region 32. The region 32 has a flat load introduction surface 40 for the introduction of the circumferential loads into the aircraft door 2, which runs essentially in the pivoting direction of the aircraft door 2.

In the closed state the door fitting 16a is located in a form fit with the fuselage fitting 20a, wherein its load introduction surface 40 is located in flat contact with the load transfer surface 32. Vectors of the circumferential forces can, for example, be transferred at an angle of approximately 70° to 90° between the door fitting 16a and the fuselage fitting 20a, so that virtually no disruptive moments are transferred in the circumferential direction.

The region 32 of the body of the door fitting 16a in the closed state is separated from the base 42 of the recess 30, so that an intermediate space is created for the accommodation of a rectangular section 44 of the body of the sliding element 24.

Figure 3:
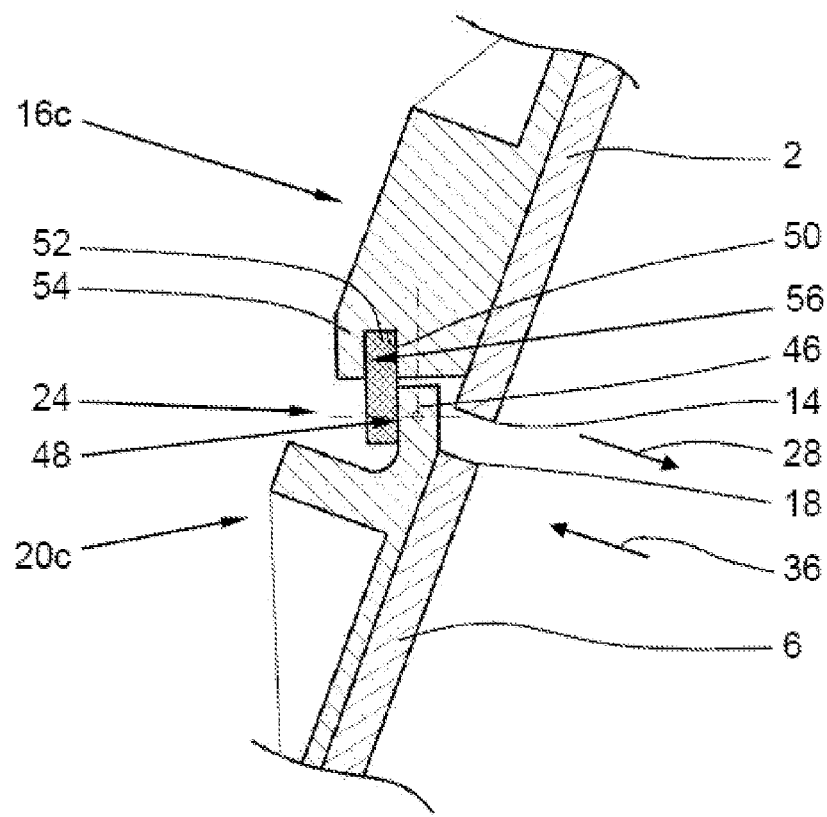
FIG. 3 shows a cross-section through a fuselage fitting and a door fitting for the transfer of radial loads in the locked state of the aircraft door.

FIG. 3 shows a cross-section through the fuselage fitting 20c and the door fitting 16c for the transfer of radial loads in the locked state.

The fuselage fitting 20c is provided with a projection 46 projecting beyond the sill 18 of the fuselage section 6 for the transfer of the radial loads. The projection 46 has a bearing surface 48 oriented in the closing direction 36 of the aircraft door 2, which runs essentially tangentially to the circumferential direction.

The door fitting 16c has a U-shaped hollow 50 for the section-by-section accommodation of a locking section 52 of the sliding element 24. The hollow 50 is bounded in the radial direction by a projection 54, which has a contact surface 56 oriented in the opening direction 28, which runs essentially tangentially to the circumferential direction.

The sliding element 24 has a rectangular cross-section and is guided in the region of the lower edge 14 of the aircraft door 2 such that it can move in the longitudinal direction of the aircraft. In the locked state its locking section 52 lies flat against the bearing surface 48 and the contact surface 56. By this means the radial loads from the fuselage fitting 20c acting on the fuselage section 6 are introduced via the sliding element 24 into the door fitting 16c. The loading on the sliding element 24 acts at right-angles to its direction of movement, so that no inadvertent opening of the aircraft door 2 can take place. Here no operative connection exists in the circumferential direction between the sliding element 24 and the fuselage fitting 20c or the door fitting 16c, so that no circumferential loads can be transferred by means of these fittings 20c, 16c.

Figure 4:
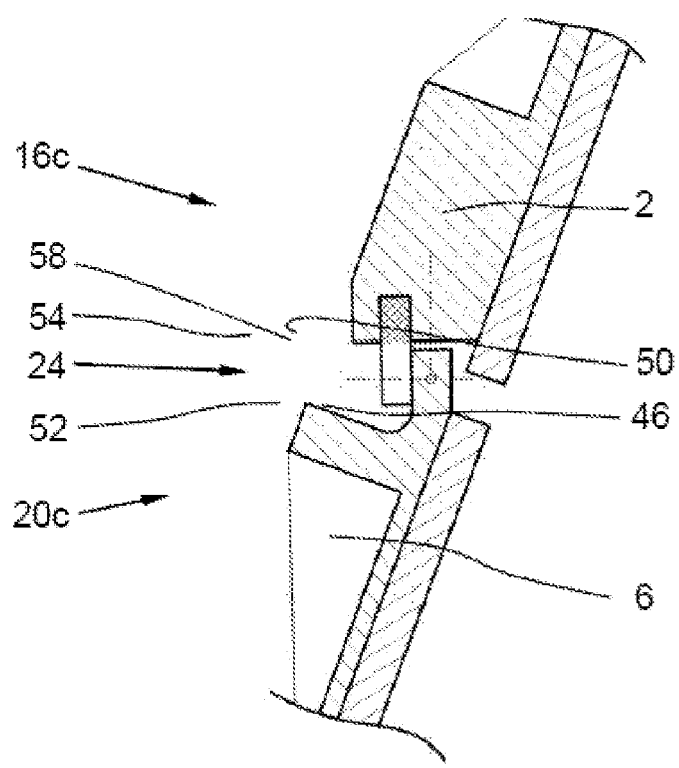
FIG. 4 shows a cross-section through a fuselage fitting and a door fitting from FIG. 3 in the unlocked state of the aircraft door.

The sliding element 24 has moreover a release section 58, which in accordance with FIG. 4 is fully located within the hollow 50 in the unlocked state. The release section 58 is designed such that it is tapered or backwards-stepped in the circumferential direction relative to the locking section 52, so that in the unlocked state no contact exists between the sliding element 24 and the projection 46 of the fuselage fitting 20c, and the fuselage door 2 can pivot upwards.

Figure 5:
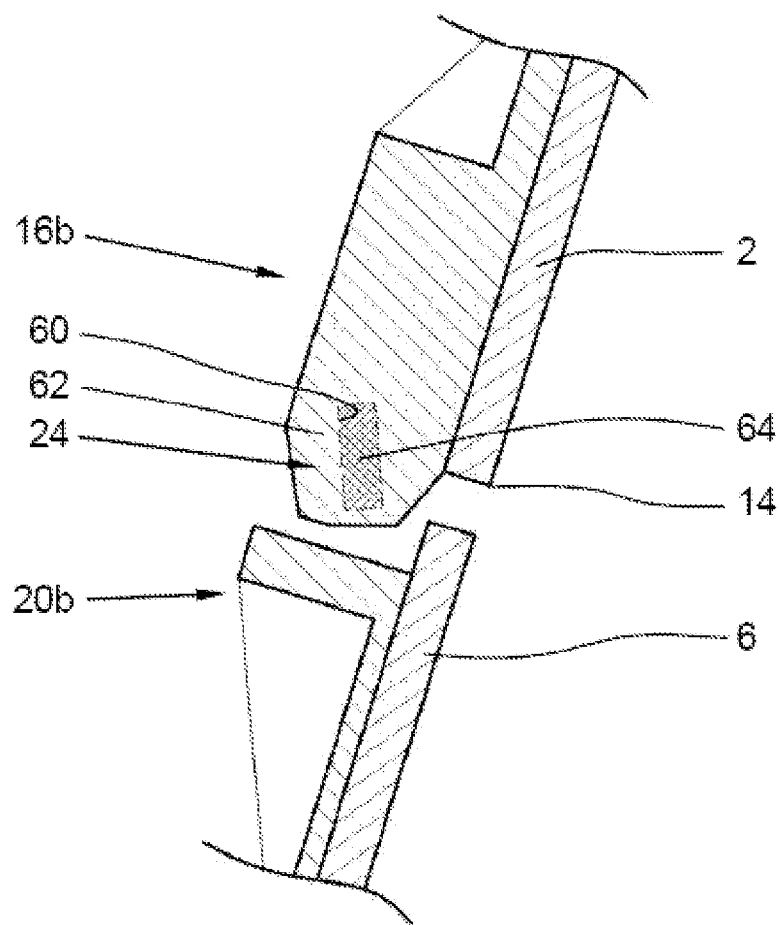
FIG. 5 shows a cross-section through a fuselage fitting and a door fitting for the guidance of a sliding element.

The guidance of the sliding element 24 in the region of the lower edge 14 of the aircraft door 2 in the longitudinal direction of the aircraft takes place in the corresponding door fittings 16b, 16d. The door fitting 16b and the fuselage fitting 20b are explained in FIG. 5 as representatives of all door fittings for the guidance of the sliding element 24.

For the guidance of the sliding element 24 the door fitting 16b has a seating 60, which is designed in a region 62 of the body of the door fitting 16b extending beyond the lower edge 14 of the aircraft door 2. It is set up to be rectangular and tangential to the circumferential direction corresponding to a guidance section 64 of the sliding element 24 that is seated in it.

The fuselage fitting 20b located opposite to the door fitting 16b is designed as an angled profile and does not undertake any guidance or load transfer functions.

Figure 6:
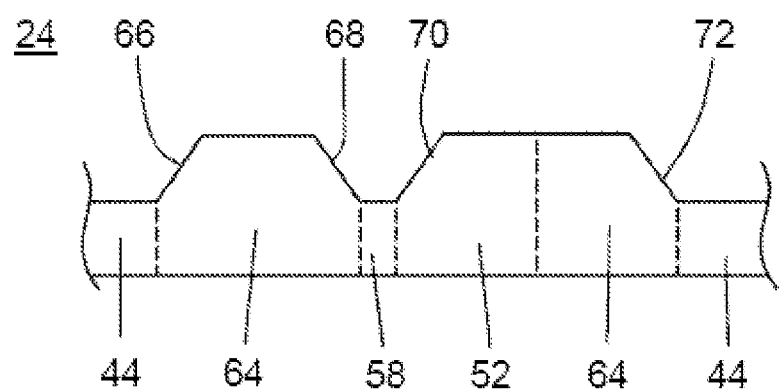
FIG. 6 shows a side view of a sub-region of the sliding element according to the present invention.

In accordance with earlier explanations the sliding element 24 has a multiplicity of different sections 44, 52, 58, 64, whose arrangement and cross-sections are selected in accordance with their functions. The sections 44, 52, 58, 64 are repeated in a regular sequence. The sequence conforms with the arrangement of the individual fuselage fittings 20a, 20b, . . . and the corresponding door fittings 16a, 16b, . . . . It can, however, be advantageous if more fittings 20a, 20e and 16a, 16e are provided for the transfer of the circumferential loads than fittings 20c, 16c for the transfer of the radial loads. If, for example, as indicated in FIG. 1, a transfer of the radial loads takes place between two door fittings 16b, 16d for the guidance of the sliding element 24, near which a transfer of the circumferential loads takes place in each case, then the sliding element 24 has the configuration shown in FIG. 6. Here it is assumed that the sliding element 24 in the illustration is to be moved to the right for the unlocking of the aircraft door 2.

The sliding element 24 has a backwards-stepped body section 44, to which an extended guidance section 64 is connected. Then follows a backwards-stepped release section 58, to which an extended locking section 52 is connected. The locking section 52 translates into a guidance section 64, which extends to a backwards-stepped body section 44. The extended sections 64, 52, 64 can have flanks 66, 68, 70, 72 that are made up from straight sections or curved. From the production technology viewpoint it can be advantageous if the extended sections 52, 64 have the same dimensions in each case and the backwards-stepped sections 44, 58 have the same dimensions in each case.

In the locked state the locking section 52 is located in operative engagement with the projection 46 of the fuselage fitting 20c and the projection 54 of the door fitting 16c. For purposes of unlocking the sliding element 24 is moved to the right in accordance with the illustration in FIG. 6 so that the release section 58 is fully located in the hollow 50 of the door fitting 16c and there is no overlap between the projection 46 of the fuselage fitting 20c and the sliding element 24. Since the hook-shaped sections 26 of the bodies of the fuselage fittings 20a, 20f and the hook-shaped sections 32 of the bodies of the door fittings 16a, 16f form no operative engagement in the radial direction, the aircraft door 2 can pivot upwards. The guidance sections 64 are located independently of the movement path of the sliding element 24 in the seatings 60 of the door fittings 16b, 16d, so that reliable guidance of the sliding element 24 always takes place without any jamming.

Disclosed is a locking means for an aircraft door, in particular for a cargo door of an aircraft, in which circumferential loads and radial loads are introduced into the aircraft door side by side in the longitudinal direction of the aircraft.

The present invention is not limited to embodiments described herein; reference should be had to the appended claims.

REFERENCE SYMBOL LIST

2 Aircraft door
4 Aperture
6 Fuselage section
8 Former
10 Upper edge
12 Hinge
14 Lower edge
16a to 16e Door fitting
18 Sill 20a to 20e Fuselage fitting
22 Coordinates system
24 Sliding element
26 Body region
28 Opening direction
30 Recess
32 Body region
34 Load transfer surface
36 Closing direction
38 Backwards step
40 Load introduction surface
42 Base
44 Body section
46 Projection
48 Bearing surface
50 Hollow
52 Locking means section
54 Projection
56 Contact surface
58 Release section
60 Seating
62 Body region
64 Guidance section
66 Flank
68 Flank
70 Flank
72 Flank

What is claimed is:

1. A locking device for an aircraft door in a fuselage section of an aircraft, the locking device comprising:
a plurality fuselage fittings disposed in a region of a sill of the fuselage section; and
a plurality of door fittings disposed in a region of a lower edge of the aircraft door and corresponding in number to the plurality of fuselage fittings, wherein each of the plurality of fuselage fittings and a respective one of the plurality of door fittings being configured to transfer one of a circumferential load and a radial load such that circumferential loads and radial loads are introduced into the aircraft door at a distance from one another along a longitudinal direction of the aircraft.

2. The locking device as recited in claim 1, wherein the transfer of the circumferential load is configured to take place via at least one of the plurality of fuselage fittings.

3. The locking device as recited in claim 2, wherein each of the plurality of fuselage fittings includes hooks.

4. The locking device as recited in claim 2, wherein each of the plurality of fuselage fittings is configured to form a form fit with a respective one of the plurality of door fittings.

5. The locking device as recited in claim 4, wherein each of the plurality of fuselage fittings and plurality of door fittings include hooks.

6. The locking device as recited in claim 1, wherein at least one of the plurality of fuselage fittings and at least one of the plurality of door fittings each include a projection configured to transfer the radial load.

7. The locking device as recited in claim 1, further comprising at least one sliding element configured to operatively connect with the plurality of door fittings and with the plurality of fuselage fittings, the transfer of the radial load being configured to take place via the at least one sliding element.

8. The locking device as recited in claim 7, wherein at least one of the plurality of fuselage fittings and at least one of the plurality of door fittings each include a projection configured to transfer the radial load, and wherein the at least one sliding element is configured to be put in bearing contact with the projection of the at least one door fitting and the projection of the at least one fuselage fitting.

9. The locking device as recited in claim 7, wherein the at least one sliding element is configured to be moved in a longitudinal direction of the aircraft and guided in at least one of the plurality of door fittings.

10. The locking device as recited in claim 7, wherein the plurality of door fittings includes two door fittings configured to guide the sliding element therebetween.

11. The locking device as recited in claim 10, wherein the plurality of door fittings includes at least one door fitting configured to transfer the circumferential load, at least one door fitting configured to transfer the radial load, and wherein the at least one door fitting configured to transfer the circumferential load, the at least one door fitting configured to transfer the circumferential load and the two door fittings configured to guide the sliding element are disposed side-by-side in a longitudinal direction of the aircraft in a repeating sequence.

12. The locking device as recited in claim 1, wherein the plurality of fuselage fittings include at least one fuselage fitting configured to transfer the circumferential load and at least one fuselage fining configured to transfer the radial load, and wherein the at least one fuselage fitting configured to transfer the circumferential load is larger than the at least one fuselage fitting configured to transfer the radial load.

13. The locking device as recited in claim 1, wherein the plurality of fuselage fittings includes a single fuselage fitting, configured to transfer circumferential load, the single fuselage fitting having a plurality of load transfer surfaces configured to transfer the circumferential load, and wherein the plurality of load transfer surfaces are disposed one behind another in a longitudinal direction of the aircraft.

14. The locking device as recited in claim 1, wherein the plurality of door fittings includes a single door fitting configured to transfer the circumferential load, the single door fitting having a plurality of load introduction surfaces configured to introduce the circumferential load, wherein the surfaces are disposed one behind another in a longitudinal direction of the aircraft.

15. The locking device as recited in claim 1, wherein the transfer of the circumferential load and the radial load are configured to take place free of moments.

16. A locking device for an aircraft door in a fuselage section of an aircraft, the locking device comprising:
a plurality of fuselage fittings disposed in a region of a sill of the fuselage section, the plurality of fuselage fittings comprising at least one circumferential fuselage fitting and at least one radial fuselage fitting, the at least one circumferential fuselage fitting having a different configuration than the at least one radial fuselage fitting; and
a plurality of door fittings disposed in a region of a lower edge of the aircraft door and corresponding in number to the plurality of fuselage fittings, the plurality of door fittings including at least one circumferential door fitting and at least one radial door fitting, the at least one circumferential door fitting having a different configuration than the at least one radial door fitting, the at least one circumferential door fitting being configured to cooperate with the at least one circumferential fuselage fitting so as to transfer a circumferential load, and the at least one radial door fitting being configured to cooperate with the at least one radial fuselage fitting so as to transfer a radial load.

* * * * *